Aug. 17, 1965 K. SENNEWALD ETAL 3,201,419
PROCESS FOR THE MANUFACTURE OF 1,3,5-TRIOXANE
Filed April 11, 1963
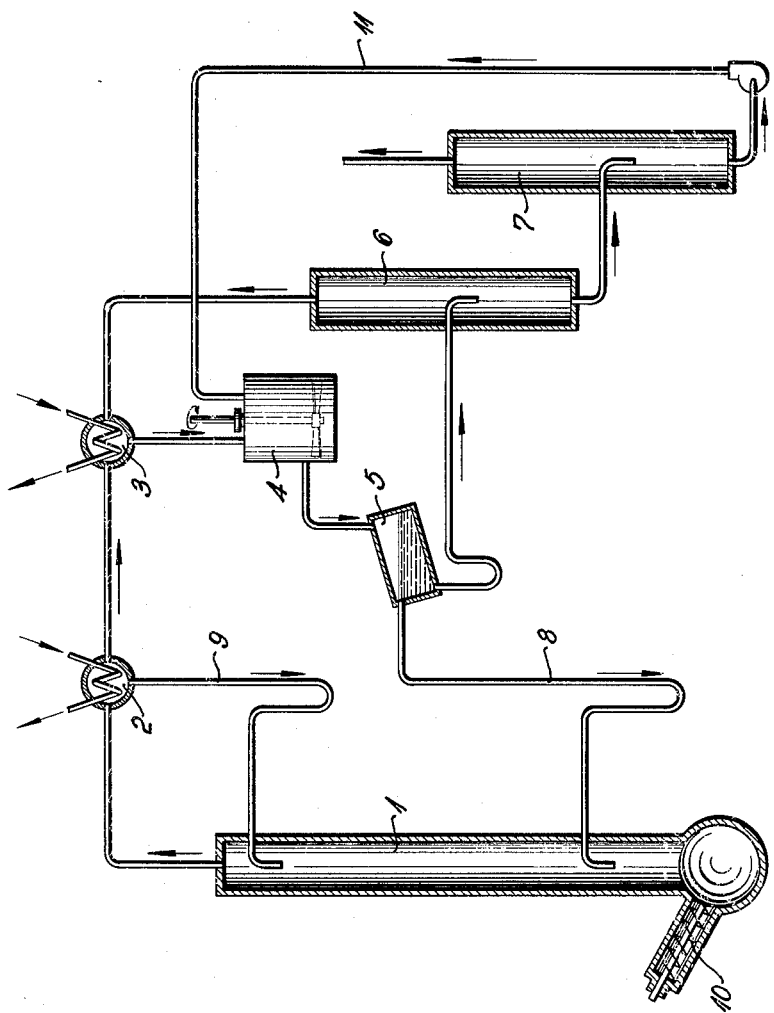
INVENTORS
KURT SENNEWALD,
WILHELM VOGT and
HUGO GUDERNATSCH
BY
Connolly and Hutz
ATTORNEYS 3,201,419
**PROCESS FOR THE MANUFACTURE OF
1,3,5-TRIOXANE**
Kurt Sennewald and Wilhelm Vogt, Knapsack, near Cologne, and Hugo Gudernatsch, Hermulheim, near Cologne, Germany, assignors to Knapsack-Griesheim Aktiengesellschaft, Knapsack, near Cologne, Germany, a corporation of Germany
Filed Apr. 11, 1963, Ser. No. 272,374
Claims priority, application Germany, May 4, 1962,
K 46,651
3 Claims. (Cl. 260—340)

The present invention relates to a process for the manufacture of 1,3,5-trioxane, briefly called hereinafter trioxane, from highly concentrated aqueous formaldehyde solutions. Trioxane is used like anhydrous formaldehyde for the manufacture of polyoxy-methylenes, a new class of interesting plastics materials.

U.S. Patents Nos. 2,304,080 and 2,347,447 describe processes wherein aqueous formaldehyde solutions containing 30 to 70% by weight, preferably 60 to 70% by weight, formaldehyde and having a hydrogen ion concentration corresponding to that caused by the presence of 0.1 to 4% by weight sulfuric acid, are subjected to continuous azeotropic distillation with the resultant formation of an aqueous solution of trioxane and formaldehyde. When the top portion of the distillation column is operated at an azeotrope temperature of 90 to 92° C., up to 80% of the formaldehyde or para-formaldehyde used can be transformed into trioxane. The trioxane can be separated from the distillate in conventional manner by extraction by means of a water-immiscible solvent. If methylene chloride is used as the extracting agent, the extraction is carried out at a temperature of 0 to 5° C., the organic phase is separated, thoroughly shaken with 28% ammonia, dried with calcium chloride, and trioxane is caused to crystallize from the methylene chloride at −80° C. If trichlorobenzene is used as the extracting agent, the extraction is carried out at a temperature of 30 to 40° C., the resulting organic layer is separated, thoroughly shaken with ammonia, dried with calcium chloride and trioxane is removed from the trichlorobenzene by distillation.

The work up at relatively low extraction temperatures involves the formation of formaldehyde polymers which complicate the process. A further disadvantage resides in the losses of yield which are the result of the organic phase being shaken with ammonia to remove residual formaldehyde therefrom and being dried with calcium chloride, and in the additional expense for chemical agents (ammonia, calcium chloride).

The present invention now provides a process for making trioxane which obviates the above-mentioned difficulties and enables the trioxane-containing distillate to be processed in an undisturbed and continuous manner with the resultant formation of a trioxane yield of more than 80%, calculated on the formaldehyde consumed.

The process of the present invention for making 1,3,5-trioxane from highly concentrated, aqueous formaldehyde solutions is more particularly carried out as follows: an aqueous solution containing about 30 to 70% by weight, preferably 60 to 70% by weight, formaldehyde or paraformaldehyde and about 0.05 to 2 mol percent of an acid, preferably about 0.05 to 1 mol percent (0.1 to 4% by weight) sulfuric acid is continuously heated, a mixture of trioxane, formaldehyde and water is removed at the top portion of a fractionating stage; the trioxane is extracted from said mixture in an extraction stage at an elevated temperature with the aid of a water-immiscible solvent boiling at a high temperature with respect to the trioxane; the resulting phases are separated; the, for example specifically lighter aqueous formaldehyde solution is returned into zones of equivalent formaldehyde concentration in the fractionating stage; the trioxane solution in the solvent used as the extracting agent, which solution may be specifically heavier, is introduced approximately into the center portion of a first distilling stage; water, formaldehyde and a portion of the trioxane are withdrawn at the top portion of said first distilling stage and returned to the extraction stage; the trioxane and the extracting agent as the sump product of the first distilling stage are introduced approximately into the center portion of a second distilling stage; pure trioxane is distilled off at the top portion of said second distilling stage; and the extracting agent as the sump product of the said second distilling stage is repumped into the extracting stage.

The fractionating zone is advantageously operated at a head temperature within the range of 89 to 92° C. under atmospheric pressure. The trioxane is most advantageously extracted with α-chloronaphthalene, preferably at a temperature of 60 to 70° C. Trichlorobenzene may also be used as the extracting agent, but in this case the extraction is preferably carried out at a temperature of 30 to 40° C.

The following particulars should be observed in carrying out the process of the present invention.

Just like the solutions used in the processes described in the above U.S. patents, the aqueous formaldehyde or paraformaldehyde solutions employed as the starting material in the present invention must contain an acid catalyst. The hydrogen ion activity of the formaldehyde solution should be equivalent to that caused by the presence of 0.1 to 4% by weight sulfuric acid. It is therefore obvious that formaldehyde solutions containing an acid other than sulfuric, i.e. about 0.05 to 2 mol percent hydrochloric acid, phosphoric acid, toluene-sulfonic acid, trichloroacetic acid, etc. can also be used.

The trioxane can be extracted from the trioxane-water-formaldehyde mixture with any hydrophobic agent, but it is generally preferred to use chlorinated hydrocarbons to that effect. High-boiling solvents, the boiling points of which differ sufficiently from the boiling points of water, formaldehyde and trioxane which are removed by distillation, have proved especially advantageous for use in the process of the present invention. This involves the advantage that the solvent which is advantageously α-chloronaphthalene (boiling point: 259.3° C. under a pressure of 760 mm. mercury), may always remain during the distillation in the sump portion of the distilling stage, energy being saved and especially pure trioxane being obtained thereby. The trioxane obtained by the present invention is free from α-chloronaphthalene and the Beilstein test therefore negative.

In the process of the present invention, only little formaldehyde is removed together with the trioxane from the fractionating stage. The residual formaldehyde remaining in the solvent used as the extracting agent is not chemically bound by means of ammonia, but separated physically by distillation and completely returned into the reaction system. This is the particular reason for the high yields of trioxane obtained, which are above 94%, calculated on the paraformaldehyde consumed.

The process of the present invention which comprises distillation and extraction is generally carried out at atmospheric pressure, but it may also be performed under reduced pressure or at elevated pressure, for example at pressures within the range of 100 mm. mercury and 10 atmospheres absolute.

The following examples serve to illustrate the invention in greater detail with reference to the accompanying drawing.

*Example 1*

1185 grams paraformaldehyde, 510 grams water and 33.5 grams (1.9% by weight respectively about 0.5 mol percent) concentrated sulfuric acid were introduced into the still of distilling column 1 (fractionating stage) and heated therein to about 102° C. An azeotropic mixture of trioxane, formaldehyde and water distilled over at the head of the column at about 89 to 90° C., a portion of said mixture being condensed in dephlegmator (reflux condenser) 2 and returned through line 9 into the top portion of distilling column 1. The bulk of the azeotrope was liquefied in total condenser 3 and flowed into extractor 4 charged with 1000 grams α-chloronaphthalene, and extracted therein, while stirring at about 65° C. As soon as product travelled from total condenser 3 into extractor 4, the still of distilling column 1 was charged, per hour, with 37 grams paraformaldehyde supplied by means of screw conveyor 10. Disturbances due to formaldehyde polymers being separated during the extraction were not observed. After 2 hours, the product obtained in extractor 4 was continuously introduced into separator 5 maintained at 65±5° C. The extractor 4 and separator 5 may be replaced with a counter-current column. In this manner, a solution of trioxane in α-chloronaphthalene which solution also contained about 0.5% by weight water and 0.3% by weight formaldehyde was obtained. The lighter aqueous phase, which contained the bulk of the formaldehyde passing over at the head of column 1 was continuously returned through line 8 into zones of equivalent formaldehyde concentration in the lower portion of column 1, i.e., into that zone of the column in which the quantitative composition of the formaldehyde-water-trioxane mixture is equivalent to the composition of the solution returned through line 8. As soon as separator 5 was filled to an extent that the aqueous phase started flowing into distilling column 1, column 6 (first distilling stage) was put into operation. To this end, a portion of the α-chloronaphthalene solution in separator 5 was continuously introduced into column 6. The product obtained at the top portion of column 6 at a temperature of 110 to 112° C. consisted of water, formaldehyde and a portion of trioxane and was supplied in vapor form to total condenser 3 in which it was condensed together with the vapors emanating from column 1. The trioxane solution freed from water and formaldehyde and obtained in the sump portion of column 6 was conveyed into column 7, in which pure trioxane boiling at 113–113.5° C. was removed as the head product, whereas α-chloronaphthalene was retained in the still portion of column 7 and repumped continuously through line 11 into extractor 4.

Polymer formation was not observed in any part of the apparatus after 200 hours of operation. Heating of the still of distilling column 1 was interrupted, the aqueous phase emanating from extractor 4 and separator 5 was added to the material in distilling column 1 and the organic phase emanating from extractor 4 and separator 5 was processed by distillation.

The experiment conducted over a period of 200 hours had the following result:

Used altogether _____ 8585 grams paraformaldehyde containing 0.4% water (Karl Fischer determination).
Corresponding to _____ 8550 grams formaldehyde.
Trioxane obtained _____ 6950 grams.
Formaldehyde, trioxane and possible polymeric formaldehyde in the still of column 1—at the end of the experiment, calculated on:
  Formaldehyde _____ 1205 grams.
  Loss _____ 395 grams.
Formaldehyde reacted _____ 7345 grams=86%.
Yield of trioxane, calculated on the formaldehyde reacted ___ 94.6%.

Example 2

1185 grams paraformaldehyde containing 0.4% water (Karl Fischer determination), 510 grams water and 33.5 grams concentrated sulfuric acid were introduced into a still having a capacity of 2 liters and the heatable receiver was charged with 500 grams α-chloronaphthalene. The material in the still was heated to boiling and distilled matter was removed during 6 hours at a head temperature of 89 to 90° C. After some hours of operation, the material in the still was only slightly opalescent.

During the distillation, the α-chloronaphthalene was thoroughly agitated, trioxane being thereby substantially extracted from the aqueous phase, and maintained at a temperature of 60 to 65°. About 70 grams distillate were obtained per hour in this working method. After 6 hours, heating of the still and stirring in the extraction stage were interrupted. The layers were separated in the receiver, the aqueous phase was returned into the still of the distilling column and the increase in weight of the organic layer was determined. A proportion of paraformaldehyde corresponding to that increase in weight was introduced into the still of the distilling column. The organic layer was distilled under atmospheric pressure. The first runnings passing over at a temperature of up to 113° C. were collected separately and pure trioxane was then isolated within a maximum of ½° C. The first runnings were returned jointly with the residue (α-chloronaphthalene) into the heated receiver and a new cycle was started.

After eight such 6 hour cycles, the experiment was balanced and the following result obtained:

Used altogether _____ 2765 grams paraformaldehyde corresponding to 2752 grams formaldehyde.
Trioxane obtained _____ 1669 grams.
Formaldehyde, trioxane, polymeric formaldehyde in the still at the end of the experiment, calculated as:
  Formaldehyde _____ 977 grams.
  Loss _____ 106 grams.
  Formaldehyde reacted _____ 1775 grams≅64%.
Yield of trioxane, calculated on formaldehyde reacted__ 94%.

Example 3

(This example is given for the purpose of comparison with the art.)

In an analogous test, the same amounts paraformaldehyde, water and sulfuric acid were used, but the distillation receiver was charged with 500 grams methylene chloride and maintained at a temperature of 0 to 5° C. by cooling. After 6 hours of reaction, the layers were separated in the receiver, the aqueous phase was returned into the still, the increase in weight of the organic phase was determined and an amount of paraformaldehyde corresponding to that increase in weight was introduced into the still. The methylene chloride layer was shaken out with 20 cc. concentrated ammonia solution and dried with a small amount of anhydrous calcium chloride after separation of the aqueous phase. After filtration, the filtrate was cooled to −70° C. and precipitated trioxane was rapidly removed by suction filtration. The filtrate (methylene chloride) was made up to 500 grams, then used again for extraction, and the preparation, extraction and processing were repeated seven times. After the eighth work up, the bulk of the methylene chloride was carefully distilled off at atmospheric pressure and a further amount of trioxane was recovered from the distillation residue by cooling anew to −70° C. The formaldehyde content was determined in the still and the test balanced.

| | |
|---|---|
| Used altogether | 2760 grams paraformaldehyde corresponding to 2748 grams formaldehyde. |
| Trioxane obtained | 1539 grams. |
| Formaldehyde, trioxane, polymeric formaldehyde in the still at the end of the experiment, calculated as: | |
| Formaldehyde | 702 grams. |
| Loss | 507 grams. |
| Formaldehyde reacted | 2046 grams ≅ 74.4%. |
| Yield of trioxane, calculated on formaldehyde reacted | 75.2%. |

The comparison of Examples 1 and 2 carried out in accordance with the present invention with Example 3 carried out in conventional manner shows at once the considerably increased yields of trioxane obtained by the present invention. In addition thereto, the trioxane obtained by distillation is purer than that which is obtained by recrystallization as demonstrated by the following table:

| | Examples 1 and 2 | Example 3 |
|---|---|---|
| Melting point | 63–63.5° C | 61–63° C. |
| Water content | 100 parts per million | 0.4%. |
| Formaldehyde content | 75 parts per million | 100 parts per million. |
| Beilstein test on chlorine | Negative | Positive. |

We claim:
1. In the process for the manufacture of 1,3,5-trioxane wherein an aqueous solution containing about 30 to 70% by weight of at least one substance selected from the group consisting of formaldehyde and paraformaldehyde and about 0.05 to 2 mol percent of an acid is continuously heated in a fractionating stage, a mixture of trioxane, formaldehyde and water is removed at the top portion of said fractionating stage at a temperature of 89° to 92° C. under atmospheric pressure, the trioxane is extracted from said mixture in an extraction stage with the aid of a water-immiscible solvent, the resulting phases comprising a solution of trioxane in the water-immiscible solvent and an aqueous formaldehyde solution are separated, the aqueous formaldehyde solution is returned into the fractionating stage and the trioxane dissolved in the water-immiscible solvent is distilled off, the improvement which comprises extracting the trioxane in the extracting stage with α-chloronaphthalene as the extracting agent at a temperature of about 60 to 70° C., returning the aqueous formaldehyde solution after separation of the resulting phases into zones of equivalent formaldehyde concentration in the fractionating stage, introducing the solution comprising trioxane in α-chloronaphthalene approximately into the center portion of a first distilling stage; withdrawing at the top portion of said first distilling stage water, formaldehyde and a portion of the trioxane; returning said mixture into the extraction stage; introducing the trioxane and the α-chloronaphthalene as the sump product of the first distilling stage approximately into the center portion of a second distilling stage; distilling off pure trioxane at the top portion of said second distilling stage; and repumping the α-chloronaphthalene as the sump product of the said second distilling stage into the extracting stage.

2. A process as claimed in claim 1, wherein the aqueous solution used as the starting material contains about 60 to 70% by weight of at least one substance selected from the group consisting of formaldehyde and paraformaldehyde.

3. A process as claimed in claim 1, wherein the aqueous solution used as the starting material contains about 0.05 to 1 mol percent sulfuric acid.

References Cited by the Examiner
UNITED STATES PATENTS 2,304,080  12/42  Frank _____ 260—340
2,347,447  4/44   Walker _____ 260—340
2,779,767  1/57   Mahan et al. _____ 260—340

WALTER A. MODANCE, *Primary Examiner.*
NICHOLAS S. RIZZO, *Examiner.*